G. E. MARSHALL.
BULLET PROBE.
APPLICATION FILED MAY 8, 1907.
902,753.
Patented Nov. 3, 1908.
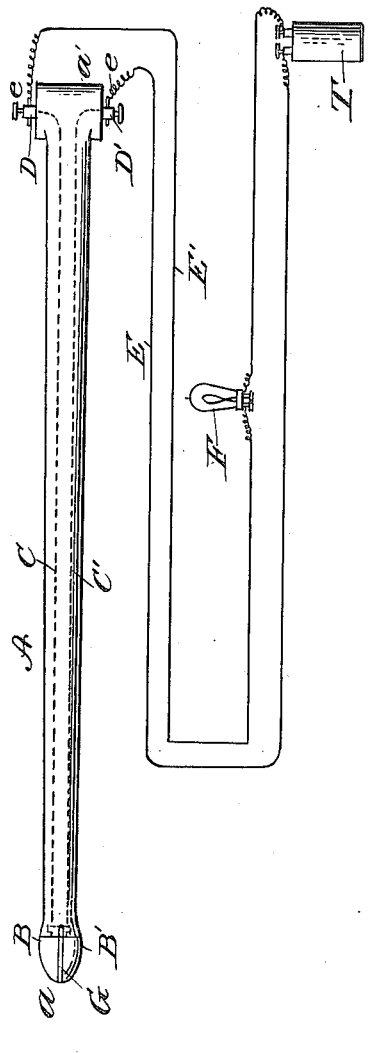
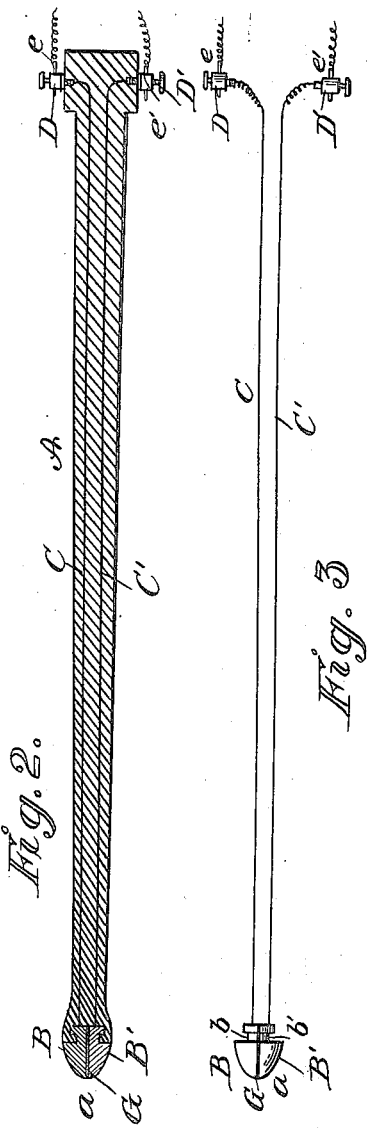
WITNESSES:
F. L. Ourand
E. Williams
INVENTOR
George E. Marshall.
BY
Attorney

UNITED STATES PATENT OFFICE.

GEORGE E. MARSHALL, OF AGUILAR, COLORADO.

BULLET-PROBE.

No. 902,753.  Specification of Letters Patent.  Patented Nov. 3, 1908.

Application filed May 8, 1907. Serial No. 372,508.

*To all whom it may concern:*

Be it known that I, GEORGE E. MARSHALL, citizen of the United States, residing at Aguilar, in the county of Las Animas and State of Colorado, have invented certain new and useful Improvements in Bullet-Probes, of which the following is a specification.

This invention relates to that class of surgical probes known as bullet probes, and it has for its object a probe of this class so constructed and arranged with its adjuncts, that a visual signal will be given the operating surgeon when the probe encounters the bullet sought for.

Said invention consists of certain features or instrumentalities substantially as hereinafter fully disclosed and defined by the claim.

In the accompanying drawings Figure 1 is a view in side elevation of a probe embodying my invention connected up to a battery having a small incandescent lamp in its circuit. Fig. 2 is a longitudinal section of the probe on a larger scale. Fig. 3 is a detail of the electrodes, binding posts and connecting wires, detached from the probe body.

As is well known, much difficulty, discomfort and even danger to life accompanies the use of probes, particularly in cases where the surgeon is searching for a bullet, or other metallic substance projected into a human body, since reliance has been mainly placed on delicacy of touch or feel when the probe encounters a solid object, and in probing for bullets the probe has been liable to encounter the splinter of a bone, which may mislead the surgeon in his work.

My invention comprises a probe, either rigid, or flexible to follow the sinuous course of a bullet, consisting of a probe body A, provided at the point $a$ with electrodes B, B' which are connected through the probe by conducting wires C C' with binding posts D D' embedded in the head of a probe body, as shown.

The binding posts are designed for connection with a battery T through its conductors E and E', and included in the battery circuit is a small incandescent lamp F, the film of which will glow in response to a current of low voltage.

The metallic electrodes B B', as shown form at their outer ends suitably shaped bodies, their inner ends being shaped, as shown to be inclosed by the point end $a$ of the probe-body A, and being grooved, as at $b\ b'$ to receive the material of the probe body whereby the parts are rigidly united.

The electrodes B B' are insulated from each other by a plate G of hard rubber, or it may be that in manufacture, the body of the probe being of rubber, the electrodes may be properly spaced apart and the body A molded about and between them.

The body A of the probe is formed of rubber, and may be worked to form a rigid staff, but is preferably vulcanized to form a flexible staff in order that it may follow the sinuous track of a bullet entering the body.

Embedded within the body A of the probe and insulated from each other thereby are conducting wires C C' leading from the electrodes B B' to binding posts D D' located in the head $a$ of the probe.

The binding posts are adapted to receive the terminals $e\ e'$ of conductors E E' leading from the poles of battery T, and included in the circuit of the battery is an incandescent lamp F giving a glow in response to a current of low voltage.

The current from the battery is so regulated by resistances, or otherwise, that no current will flow when the electrodes at the point of the probe are in contact with the bones or tissues or internal fluids of the body, the conductivity thereof being not sufficient to excite the flow, but upon encountering a bullet, or other metal, the circuit will be closed, and the lamp indicate to the surgeon that metal has been found.

Claim.

A device of the character described, embracing a flexible or yielding body-member formed of insulating material and equipped at one end with binding posts, complemental probe-members applied to said body-member at its opposite end and adapted to form electrodes opposed to each other and having interposed therebetween an insulating plate, conducting wires embedded in said insulating flexible body-member and connecting with said binding posts and said electrodes or probe-members, a battery, electrical wire connections between said binding posts and said battery, a low-voltage incandescent filament-lamp arranged in said electrical connections and a current-regulating resistance arranged in the latter for interrupting the flow of any current when said electrodes contact with the bones of the body as in the probing operation.

In testimony whereof I affix my signature, in presence of two witnesses.

GEORGE E. MARSHALL.

Witnesses:
GEORGE W. NORMAN,
HARRY C. COSSUM.